United States Patent [19]
Bessler

[11] Patent Number: 5,243,829
[45] Date of Patent: Sep. 14, 1993

[54] LOW REFRIGERANT CHARGE DETECTION USING THERMAL EXPANSION VALVE STROKE MEASUREMENT

[75] Inventor: Warren F. Bessler, Schenectady, N.Y.

[73] Assignee: General Electric Company, Schenectady, N.Y.

[21] Appl. No.: 964,244

[22] Filed: Oct. 21, 1992

[51] Int. Cl.$^5$ ............................................... F25B 49/02
[52] U.S. Cl. ........................................ 62/126; 62/129; 62/131; 62/158
[58] Field of Search ................. 62/126, 129, 131, 204, 62/205, 206, 210, 209, 211, 212, 222, 223, 224, 225, 158

[56] References Cited
U.S. PATENT DOCUMENTS

| | | | |
|---|---|---|---|
| 3,698,204 | 10/1972 | Schlotterbeck et al. | 62/206 |
| 3,913,347 | 10/1975 | Stevens | 62/209 |
| 4,167,858 | 9/1979 | Kojima et al. | 62/126 |
| 4,545,212 | 10/1985 | Noda | 62/129 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,765 | 5/1988 | Pettitt | 62/129 |
| 4,745,767 | 5/1988 | Ohya et al. | 62/211 |
| 5,005,370 | 4/1991 | Tanaka et al. | 62/211 |

*Primary Examiner*—Harry B. Tanner
*Attorney, Agent, or Firm*—Patrick R. Scanlon; Paul R. Webb, II

[57] ABSTRACT

Low refrigerant charge is detected in a refrigeration system under thermal expansion valve control with a valve stem stroke measurement switch. The switch includes a first contact mounted on the valve stem of the thermal expansion valve and a second contact mounted on the valve casing. The two contacts are aligned in the direction of valve stem motion and are relatively positioned so as to be normally closed but to open when the valve stem reaches its full stroke position. At least one of the contacts is mounted to its respective structure by a flexible member to accommodate the motion of the valve stem. The switch is connected to the compressor clutch to deactivate the compressor when opened. A timer can be provided to delay deactivation of the compressor in instances where the valve stem is just momentarily at full stroke. Alternatively, the valve stem stroke measurement switch can be configured to be normally open but to close at full stroke, or the switch can include three contacts in which a first contact engages one of other contacts at full stroke and engages the remaining contact when the valve stem is not at full stroke.

24 Claims, 3 Drawing Sheets

LOW REFRIGERANT CHARGE DETECTION USING THERMAL EXPANSION VALVE STROKE MEASUREMENT

CROSS REFERENCES TO RELATED APPLICATIONS

This application is related to copending application entitled "Differential Pressure Superheat Sensor for Low Refrigerant Charge Detection," Ser. No. 07/964,545 filed on Oct. 21, 1992, filed concurrently herewith and assigned to the same assignee as the present invention.

BACKGROUND OF THE INVENTION

This invention relates generally to detecting low refrigerant charge in refrigeration systems, particularly automotive air conditioning systems, and more particularly concerns using a switch mounted in the thermal expansion valve to determine when the valve is wide open as an indication of low charge. As used herein, the term "refrigeration system" refers to refrigerators, air conditioners or any other system which produces a refrigeration effect. However, the present invention is most applicable to air conditioning systems for automobiles.

In typical automotive air conditioning systems, refrigerant tends to leak through hose permeation and the rotating compressor shaft seal. Refrigerant leakage causes many problems. First, the release of refrigerants into the environment is believed to cause environmental damage. For this reason, enactment of a federal environmental protection law requiring low charge detection systems for automobiles is anticipated. Second, when the refrigerant charge becomes insufficient, the reliability and cooling performance of the system suffer. Thus, a refrigeration system with a low charge is inefficient and wasteful of energy. Furthermore, low charge causes increased compressor operating temperatures while lowering mass flow rate. Reduced mass flow rate can result in insufficient flow of lubricating oil to the compressor. The lack of oil combined with high temperatures eventually causes compressor failure. Thus, there is much interest in developing means for detecting low charges.

There are a number of known ways to detect low charge, but many of these present certain disadvantages. For instance, determining low charge by measuring refrigerant inventory will not always be accurate because the optimum inventory level varies in accordance with many variables such as compressor speed, ambient and interior temperatures, blower speed, and component volumes. Other systems employ a low pressure cut-off switch which deactivates the compressor when system pressure falls below a predetermined threshold. However, since system pressures fluctuate greatly during proper operation (25–46 psi is typical), the predetermined threshold pressure must be set very low, such as 10–20 psi. As a result, the low pressure cut-off switch is effective to indicate only a severe loss of charge resulting from a ruptured hose or complete shaft seal failure. This switch will not detect marginal low charge conditions.

One way of detecting low charge which avoids the above problems is to monitor the superheat at the evaporator exit. Superheat is the amount of temperature above the saturation temperature of the refrigerant. For air conditioning systems under thermal expansion valve control, the evaporator exit exhibits a small amount of superheat (typically 0°–10° F.), but if the system charge drops below a sufficient level, excess evaporator exit superheat will develop. However, a high degree of evaporator exit superheat can exist with a full charge under some conditions. For example, during startup or rapid acceleration, the expansion valve does not open fast enough to control the sudden increase in the compressor flow rate and excess evaporator exit superheat develops. Therefore, excessive superheat at the evaporator exit is not always an indication of low charge in air conditioning systems under thermal expansion valve control. Thus, direct measurement of evaporator exit superheat will sometimes produce false indications of low charge.

SUMMARY OF THE INVENTION

Accordingly, it is an object of the present invention to provide an apparatus which indirectly monitors evaporator exit superheat to detect marginal low charge conditions.

More specifically, it is an object of the present invention to provide an apparatus which infers excess evaporator exit superheat by monitoring the degree of opening of the thermal expansion valve.

These and other objects are accomplished in the present invention by providing a refrigeration system under thermal expansion valve control with a valve stem stroke measurement switch. The switch is mounted in the thermal expansion valve and comprises a first contact mounted on the valve stem and a second contact mounted on the valve casing. The two contacts are aligned in the direction of valve stem motion and are relatively positioned so as to be normally closed but to open when the valve stem reaches its full stroke position. At least one of the contacts is mounted to its respective structure by a flexible member to accommodate the motion of the valve stem. The switch is connected to the compressor clutch to deactivate the compressor when opened. A timer can be provided to delay deactivation of the compressor in instances where the valve stem is just momentarily at full stroke.

Alternatively, the valve stem stroke measurement switch can be configured to be normally open but to close at full stroke. In this case, the switch can be connected to a relay which causes compressor deactivation when the switch is closed, an indicator which is activated when the switch is closed, or both the relay and the indicator. Another alternative is that the switch can include three contacts in which a first contact engages one of other contacts at full stroke and engages the remaining contact when the valve stem is not at full stroke.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
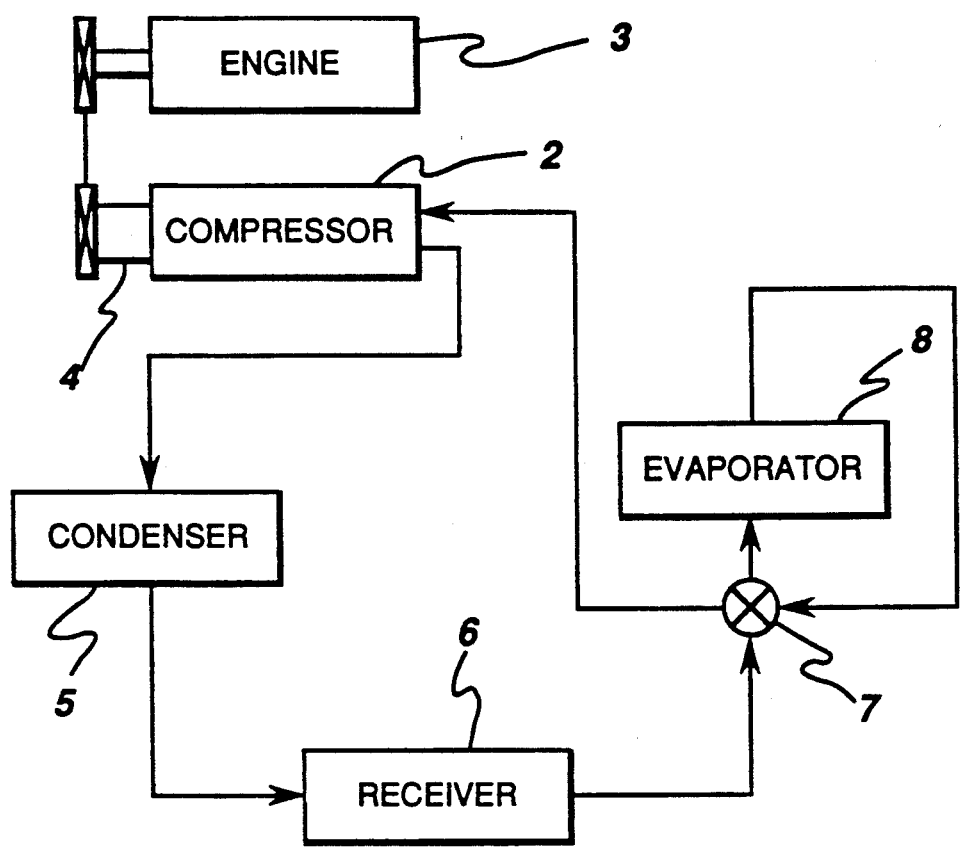
FIG. 1 is a schematic diagram of a refrigeration system having thermal expansion valve control.

Referring to the drawing wherein the same reference numerals are used to identify the same elements throughout the several views, FIG. 1 shows a refrigeration system in which the low refrigerant charge detection of the present invention can be used. The refrigeration system, which will typically be an automotive air conditioning system, includes a compressor 2 which is selectively driven by an engine 3 through a clutch 4, with refrigerant being compressed by the compressor 2 to high temperature and pressure. The refrigerant is then condensed by a condenser 5 where it loses heat to the ambient. The refrigerant is then directed to a receiver 6 which passes only liquid refrigerant, thereby separating any vaporous refrigerant which may not have been fully condensed by the condenser 5. The liquid refrigerant flows through a thermal expansion valve 7 so that it undergoes adiabatic expansion. The now low pressure refrigerant flows through an evaporator 8 where it is vaporized through the absorption of heat around the evaporator 8. The gaseous refrigerant exiting the evaporator 8 is returned to the compressor 2 through the internally-equalized thermal expansion valve 7 to repeat the cycle.

The present invention is applicable to refrigeration systems using expansion valve control and is not used with orifice tube refrigeration systems. Thermal expansion valves can be either internally- or externally-equalized. In internally-equalized thermal expansion valves, the refrigerant exiting the evaporator is passed through the expansion valve housing before entering the compressor in order to provide thermal control over the valve opening. In externally-equalized thermal expansion valves, the refrigerant exiting the evaporator is directly routed to the compressor and a thermal bulb located at the evaporator exit and connected to the expansion valve provides thermal control over the valve opening. While the present invention is described in conjunction with an internally-equalized thermal expansion valve 7, it is equally applicable to externally-equalized thermal expansion valves, such as that shown in FIG. 1 of U.S. Pat. No. 5,005,370 issued Apr. 9, 1991 to Hazime Tanaka et al. and hereby incorporated by reference.

The present invention detects low charge by monitoring the opening of the thermal expansion valve 7. During normal full charge operation, the refrigerant exiting the evaporator 8 will exhibit a small degree of superheat (typically about 10° F.), although increased superheat may occur during some transient, full charge conditions. The thermal expansion valve will not normally be wide open under these conditions. If refrigerant charge falls below a sufficient level however, evaporator superheat will rise rapidly. The thermal expansion valve 7 will fully open in response to the excess evaporator superheat. Thus, a sustained wide open condition of the thermal expansion valve 7 is indicative of low refrigerant charge.

Figure 2:
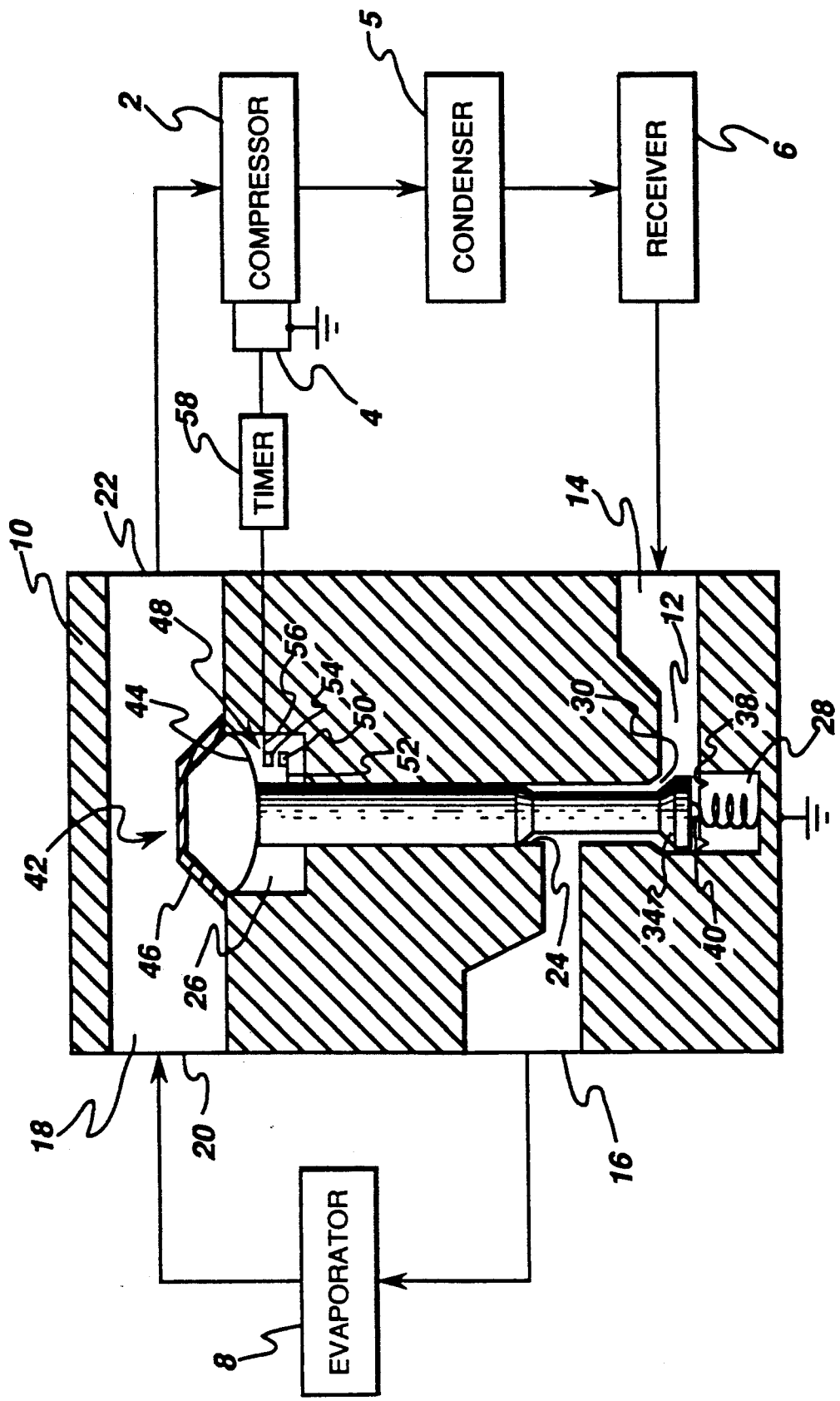
FIG. 2 is a schematic diagram of a refrigeration system including a sectional view of a thermal expansion valve showing a first embodiment of the present invention.

Turning now to FIG. 2, a means for detecting the wide open condition of the thermal expansion valve 7 is shown. As shown in FIG. 2, the thermal expansion valve 7 is an internally-equalized, H-block type expansion valve. This is only for purposes of illustration and is not meant to be limiting; as mentioned above, the present invention can also be used with externally-equalized expansion valves. The thermal expansion valve 7 includes a casing 10 which is preferably made of a metal such as aluminum. A first refrigerant passage 12 is formed in the lower portion of the casing 10. The first refrigerant passage 12 has a refrigerant inlet 14 which is connected in fluid communication with the outlet of the receiver 6 and a refrigerant outlet 16 which is connected in fluid communication with the inlet of the evaporator 8. A second refrigerant passage 18 is formed in the upper portion of the casing 10. The second refrigerant passage 18 has a refrigerant inlet 20 which is connected in fluid communication with the outlet of the evaporator 8 and a refrigerant outlet 22 which is connected in fluid communication with the inlet of the compressor 2. A bore 24 formed in the casing 10 between the first refrigerant passage 12 and the second refrigerant passage 18 is also provided. The bore 24 includes an enlarged portion 26 adjacent to the second refrigerant passage 18 and extends beyond the first refrigerant passage 12 to define a spring well 28. A valve seat 30 is formed at the intersection of the bore 24 and the top of the first passage 12.

A valve stem 32 is disposed in the bore 24 for vertical or longitudinal movement therein. The valve stem 32 is an elongated shaft having a valve body 34 integrally formed on the lower end thereof. The valve body 34 is of a truncated conical shape and has a peripheral surface which matches the surface of the valve seat 30. A coil spring 36 is disposed in the spring well 28. The coil spring 36 is maintained in a compressed state so as to bias the valve stem 32 upward. A bellows member 38 is provided to prevent refrigerant in the first passage 12 from entering the spring well 28 while permitting displacement of the coil spring 36. Force from the spring 36 is transmitted to the valve stem 32 via a bearing 40.

A refrigerant-filled thermal bulb 42 is disposed at the upper end of the valve stem 32 and is positioned to be exposed to the refrigerant in the second passage 18. The thermal bulb 42 includes a diaphragm 44 mostly disposed in the enlarged portion 26 of the bore 24 and a thermally conductive cap member 46 disposed in the second refrigerant passage 18. The diaphragm 44 and the cap member 46 are sealed together with a refrigerant therein. The diaphragm 44 is connected to the upper end of the valve stem 32 so as to transmit force thereto. Thus, when the refrigerant temperature in the second passage 18 rises, heat is transferred to the refrigerant in the thermal bulb 42. The resultant expansion of the diaphragm 44 displaces the valve stem 32 downward against the biasing force of the coil spring 36. When the valve stem 32 is displaced upward so that the valve body 34 abuts the valve seat 30, flow through the first refrigerant passage 12 is prevented. When the valve stem 32 is at it lowest position, i.e., its full stroke position, the valve 7 is wide open and permits the maximum level of refrigerant flow through the first passage 12.

A valve stem stroke measurement switch 48 is provided to indicate when the valve stem 32 is at full stroke. The switch 48 includes a first contact 50 which is mounted to the valve stem 32 by a first support arm 52 and a second contact 54 which is mounted to the casing 10 in the enlarged portion 26 by a second support arm 56. The contacts 50,54 are aligned in the direction of valve stem motion (i.e., vertically) and are relatively positioned with the second contact 54 above the first contact 50 so as to break contact when the valve stem 32 reaches full stroke, as shown in FIG. 2. Since the contacts 50,54 must maintain contact through the rest of the range of motion in which the valve stem 32 is not at full stroke, at least one of the support arms 52,56 is made to be flexible. The valve stem stroke measurement switch 48 is electrically connected to the compressor clutch 4 by suitable conductors so that when the switch 48 opens due to low charge, the compressor 2 is deactivated, thereby shutting down the refrigeration system. Although the switch 48 is shown at the upper end of the valve stem 32, this is only exemplary; the switch 48 can be configured in any manner as long as it is triggered at valve stem full stroke.

In operation, when the refrigeration system is operating under normal charge conditions, the discharge from the evaporator 8 will exhibit the normal small amount of superheat. Consequently, the expansion valve 7 will accordingly open an appropriate amount (not wide open) to regulate the flow of refrigerant into the evaporator 8. As long as the valve stem 32 is not at full stroke, the contacts 50,54 will remain closed, thereby permitting the compressor 2 to operate. If, however, the refrigeration system experiences a loss of charge, then the evaporator exit will exhibit significant superheat. In response to the increased superheat, the expansion valve 7 will open more to enable increased refrigerant flow to the evaporator 8. When the valve stem 32 reaches full stroke, the contacts 50,54 will open, thereby deactivating the compressor 2.

Even under full charge, an expansion valve can experience a transient wide open condition. For instance, in systems where the expansion valve is slightly undersized, the valve stem can momentarily achieve full stroke during the high load conditions of initial pull-down. To avoid spurious signals under such transient conditions, the present invention can be provided with a timer 58 connected to the switch 48 and the clutch 4. Thus, when the switch 48 is opened in response to a transient full stroke condition, the timer 58, which could be any such type of device known in the art, would keep the clutch 4 engaged for a time period long enough (typically 30-180 seconds) to avoid erroneous deactivation of the compressor 2.

Figure 3:
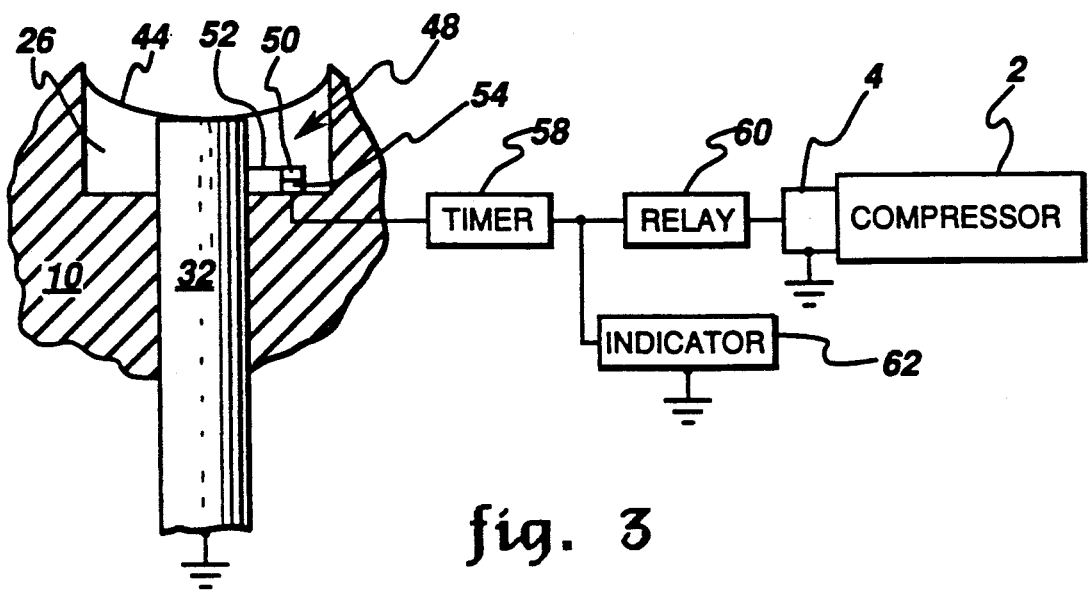
FIG. 3 is a partial sectional view of a thermal expansion valve schematically showing a second embodiment of the present invention.

FIG. 3 shows an alternative embodiment of the valve stem stroke measurement switch 48. In this embodiment, a first contact 50 is mounted to the valve stem 32 by a support arm 52 and a second contact 54 is mounted to the casing 10. While the second contact 54 is shown directly mounted to the casing 10, it can optionally be mounted via a support arm. The support arms may be flexible. The contacts 50,54 are vertically aligned with the first contact 50 above the second contact 54 and are relatively spaced so as to make contact only when the valve stem 32 reaches full stroke, as shown in FIG. 3. The switch 48 can be electrically connected to the clutch 4 via a relay 60 so that when the switch 48 is closed at full stroke, the relay 60 deactivates the compressor 2, thereby shutting down the refrigeration system. The switch 48 can also be electrically connected to an indicator 62, such as a light on the dashboard, so that when closed, the indicator 62 is activated, thereby indicating that the refrigeration system is in need of service. Thus, this embodiment of the switch 48 can be arranged to deactivate the compressor 2, provide a visual low charge signal, or do both in response to the valve stem 32 achieving full stroke. As with the first embodiment, a timer 58 can be included to avoid false signals.

Figure 4:
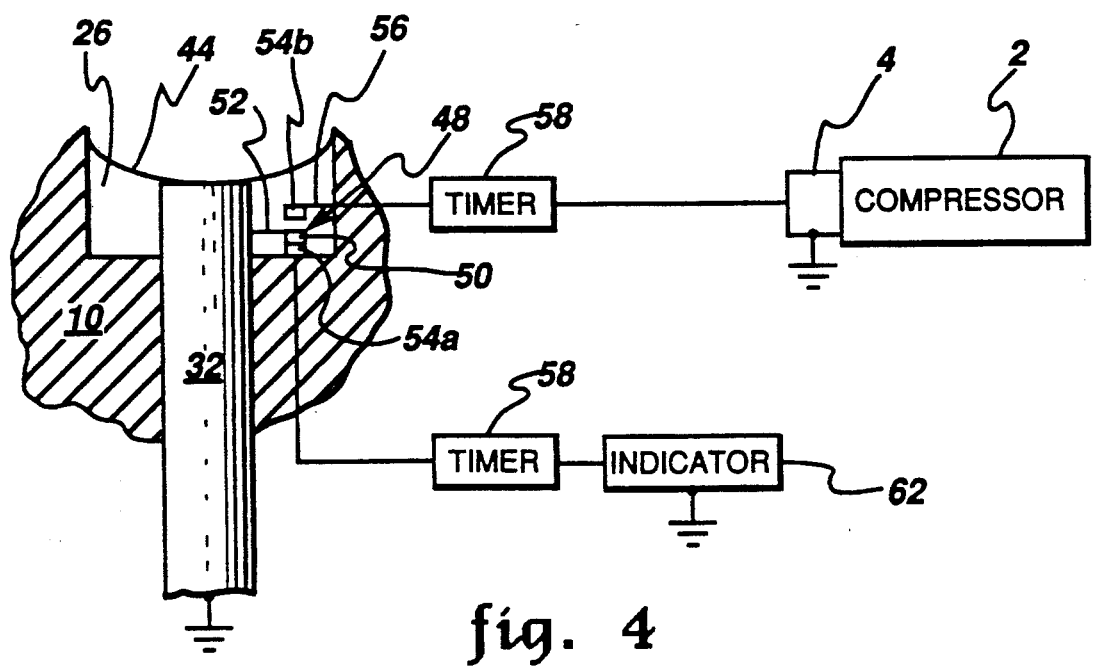
FIG. 4 is a partial sectional view of a thermal expansion valve schematically showing a third embodiment of the present invention.

FIG. 4 shows another alternative embodiment of the valve stem stroke measurement switch 48. In this embodiment, a first contact 50 is mounted to the valve stem 32 by a first support arm 52, and second and third contacts 54a,54b are mounted to the casing 10 in vertical alignment with the first contact 50. The third contact 54b is mounted via a second support arm 56. At least one of the support arms 52,56 is made to be flexible. While the second contact 54a is shown directly mounted to the casing 10, it can optionally be mounted via a support arm which may be flexible. All three contacts 50,54a,54b are relatively spaced so that the first contact 50 and the second contact 54a make contact only when the valve stem 32 reaches full stroke (as shown in FIG. 4); the first contact 50 engages the third contact 54b at all other valve stem stroke positions. The first contact 50 and the second contact 54a are electrically connected with an indicator 62, while the first contact 50 and the third contact 54b are electrically connected with the clutch 4. Thus, as long as there is not excessive superheat at the evaporator exit, the valve stem 32 will not be at full stroke and the first and third contacts 50,54b will be closed, thereby permitting the compressor 2 to operate. But when excess superheat develops, the valve stem 32 will reach full stroke and the first and second contacts 50,54a will close, thereby activating the indicator 62 while rendering the compressor 2 inoperative. Again, a timer 58 can be included.

The foregoing has described a method and apparatus in which marginal low charge conditions are detected by monitoring the opening of the thermal expansion valve. Monitoring the thermal expansion valve opening provides an indirect measure of excessive evaporator exit superheat, thus avoiding detection of some superheat conditions which are not attributable to low charge.

While specific embodiments of the present invention have been described, it will be apparent to those skilled in the art that various modifications thereto can be made without departing from the spirit and scope of the invention as defined in the appended claims.

What is claimed is:

1. A thermal expansion valve comprising:
   a casing;
   a valve stem disposed in said casing which is movable in a longitudinal direction; and
   a switch having first and second states, wherein said switch changes from said first state to said second state whenever said valve stem reaches full stroke.

2. The thermal expansion valve of claim 1 wherein said switch comprises a first contact mounted on said casing and a second contact mounted on said valve stem and aligned with said first contact in the longitudinal direction, said first and second contacts being relatively positioned so as to be closed when said switch is in said first state and open when said switch is in said second state.

3. The thermal expansion valve of claim 2 wherein said first contact is mounted to said casing via a flexible member.

4. The thermal expansion valve of claim 2 wherein said second contact is mounted to said valve stem via a flexible member.

5. The thermal expansion valve of claim 1 wherein said switch comprises a first contact mounted on said casing and a second contact mounted on said valve stem and aligned with said first contact in the longitudinal direction, said first and second contacts being relatively positioned so as to be open when said switch is in said first state and closed when said switch is in said second state.

6. The thermal expansion valve of claim 1 wherein said switch comprises a first contact mounted on said casing, a second contact mounted on said casing and a third contact mounted on said valve stem, said first, second and third contacts being aligned in the longitudinal direction, said first and third contacts being relatively positioned so as to be closed when said switch is in said first state and open when said switch is in said second state and said second and third contacts being relatively positioned so as to be open when said switch is in said first state and closed when said switch is in said second state.

7. The thermal expansion valve of claim 6 wherein said first contact is mounted to said casing via a flexible member.

8. The thermal expansion valve of claim 6 wherein said third contact is mounted to said valve stem via a flexible member.

9. A low refrigerant charge detection circuit for a refrigeration system including a compressor and a thermal expansion valve having a casing and a valve stem which is movable in a longitudinal direction, said circuit comprising:
 a first contact mounted on said casing; and
 a second contact mounted on said valve stem and aligned with said first contact in the longitudinal direction, said second contact being movable between a first position contacting said first contact and a second position not contacting said first contact, said first and second contacts being relatively positioned so that said second contact changes position whenever said valve stem reaches full stroke.

10. The low refrigerant charge detection circuit of claim 9 wherein said second contact is normally in said first position and changes to said second position whenever said valve stem reaches full stroke.

11. The low refrigerant charge detection circuit of claim 10 wherein said first and second contacts are connected to the compressor so as to deactivate the compressor when said second contact is in said second position.

12. The low refrigerant charge detection circuit of claim 11 further comprising a timer connected to said first and second contacts to delay deactivation of the compressor for a predetermined time.

13. The low refrigerant charge detection circuit of claim 10 further comprising a third contact mounted to said casing and aligned with said first and second contacts in the longitudinal direction, said second and third contacts being relatively positioned so that said second contact does not contact said third contact when in said first position and said second contact does contact said third contact when in said second position.

14. The low refrigerant charge detection circuit of claim 13 further comprising an indicator connected to said second and third contacts and wherein said first and second contacts are connected to the compressor, said indicator being activated and said compressor being deactivated when said second contact is in said second position.

15. The low refrigerant charge detection circuit of claim 9 wherein said second contact is normally in said second position and changes to said first position whenever said valve stem reaches full stroke.

16. The low refrigerant charge detection circuit of claim 15 further comprising an indicator connected to said first and second contacts, said indicator being activated when said second contact is in said first position.

17. The low refrigerant charge detection circuit of claim 16 further comprising a relay connected to the compressor and said first and second contacts, said relay causing the compressor to be deactivated when said second contact is in said first position.

18. The low refrigerant charge detection circuit of claim 17 further comprising a timer connected to said first and second contacts to delay activation of said indicator and said relay for a predetermined time.

19. The low refrigerant charge detection switch of claim 9 wherein said first contact is mounted to said casing via a flexible member.

20. The low refrigerant charge detection switch of claim 9 wherein said second contact is mounted to said valve stem via a flexible member.

21. A method of determining low refrigerant charge in a refrigeration system having a thermal expansion valve having a movable valve stem, said method comprising the steps of:
 monitoring the position of the valve stem; and
 producing a signal in response to said valve stem reaching full stroke.

22. The method of claim 21 wherein the step of producing a signal comprises opening a switch.

23. The method of claim 21 wherein the step of producing a signal comprises closing a switch.

24. The method of claim 21 wherein the step of producing a signal includes waiting for a predetermined time after said valve stem reaches full stroke.

* * * * *